(12) United States Patent
Kim

(10) Patent No.: US 6,370,101 B1
(45) Date of Patent: Apr. 9, 2002

(54) TRAY STRUCTURE FOR OPTICAL RECORDING REPRODUCING DEVICE

(75) Inventor: Tae Hyoung Kim, Suwon (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/382,783

(22) Filed: Aug. 25, 1999

(30) Foreign Application Priority Data

Sep. 18, 1998 (KR) .............................. 98/38638

(51) Int. Cl.⁷ .......................... G11B 33/04; G11B 17/04
(52) U.S. Cl. ..................................................... 369/77.1
(58) Field of Search ............................ 369/77.1, 77.2, 369/75.1, 75.2, 30.9, 30.93, 30.99

(56) References Cited

U.S. PATENT DOCUMENTS

| | | | |
|---|---|---|---|
| 4,771,890 A | * | 9/1988 | Hofland et al. .............. 206/445 |
| 5,315,463 A | * | 5/1994 | Dew et al. ................ 360/98.08 |
| 5,504,646 A | * | 4/1996 | Tanaka et al. ............... 360/135 |
| 5,978,342 A | * | 11/1999 | Ju et al. ..................... 369/75.2 |
| 6,122,240 A | * | 2/2000 | Kim .......................... 369/77.1 |
| 6,044,058 A | * | 3/2000 | Miyazaki et al. ........... 369/291 |
| 6,134,205 A | * | 10/2000 | Watanabe .................. 369/77.1 |
| 6,160,781 A | * | 12/2000 | Koshino et al. ........... 369/75.2 |

FOREIGN PATENT DOCUMENTS

| | | | |
|---|---|---|---|
| JP | 401303666 A | * | 12/1989 |
| JP | 2-42678 | * | 2/1990 |
| JP | 5-2814 | * | 1/1993 |
| JP | 7320468 | | 12/1995 |
| JP | 8-106700 | * | 4/1996 |
| JP | 10-125026 | * | 5/1998 |
| JP | 10-177756 | * | 6/1998 |
| JP | 2000-021056 | * | 1/2000 |

* cited by examiner

Primary Examiner—David L. Ometz
(74) Attorney, Agent, or Firm—Birch, Stewart, Kolasch & Birch, LLP

(57) ABSTRACT

The present invention relates to a tray structure for an optical recording reproducing device which can improve a reproducing ability of the device and reduce vibration and noise, by uniforming a resistance generated when a fluid is contacted with each portion of the disc mounted and rotated on the tray. A distance between each receiving surface of the tray for receiving and reproducing recording media having a different size and the recording medium is identical at a rotation center portion of the recording medium and an outer portion thereof.

2 Claims, 4 Drawing Sheets

TRAY STRUCTURE FOR OPTICAL RECORDING REPRODUCING DEVICE

BACKGROUND OF THE INVENTION

1. Field of the Invention

The present invention relates to an optical recording reproducing device, and in particular to a tray structure for an optical recording reproducing device which can improve a reproducing ability of the device and reduce vibration and noise by uniforming a resistance generated when a fluid is contacted with each portion of the disc received and rotated on a tray.

2. Description of the Background Art

A disc, one of the widely-used recording media, is divided into a disc having a diameter of 12 cm (hereinafter, referred to as 'general disc') and a disc having a diameter of 8 cm (hereinafter, referred to as 'compact disc'). A general disc receiving unit and a compact disc receiving unit are held in a recess of the tray which receives the two kinds of discs.

Referring to FIGS. 1 and 2, a general disc receiving unit 2 for receiving a general disc 5 is shown as having a recessed portion.

In addition, a compact disc receiving unit 3 for receiving a compact disc has a comparatively greater recess in a center portion of the general disc receiving unit 2, forming a concentric circle with the general disc receiving unit 2.

A pickup unit 4 is formed expansively from the center portion of the receiving surfaces 2a, 3a of the disc receiving units 2, 3 to an outer surface thereof.

A spindle motor (not shown) for rotating the mounted disc, and a pickup (not shown) for linear movement in the pickup unit 4 and reading a signal recorded in the mounted disc, are formed at the lower portion of the pickup 4.

The recording surface of the disc is positioned separately from the receiving surface of the disc receiving unit by a predetermined distance so that the disc can be smoothly rotated at a predetermined velocity by driving of the optical recording reproducing device.

The structure of the disc receiving units 2, 3 will now be described in detail with reference to FIG. 2.

A first protrusion 2b is formed along the outer circumferential portion of the general disc receiving unit 2.

When the user mounts the general disc 5 on the general disc receiving unit 2, the first protrusion 2b prevents the lower surface of the general disc 5 which is the recording surfaces 5a, 5b where information is recorded from being contacted with the receiving surfaces 2a, 3a, thereby preventing the general disc 5 from being damaged or contaminated by foreign substances.

In more detail, the information is not stored in every portion of the lower surface of the disc. That is, non-recording surfaces 5c, 5c where the information is not stored, are formed at an outer circumferential portion and a center portion of the disc, respectively.

Accordingly, when the general disc 5 is mounted on the general disc receiving unit 2, the non-recording surface 5c formed at the outer circumferential portion of the general disc 5 is supported by the first protrusion 2b, thereby preventing the recording surfaces 5a, 5b of the general disc 5 from being contacted with the first and second receiving surfaces 2a, 3a. As a result, there is a lesser chance that the general disc 5 will be damaged or contaminated by foreign substances.

Similarly, a second protrusion 3b is formed at the outer end portion of the compact disc receiving unit 3, and thus prevents the recording surface of the compact disc from being contacted with the second receiving surface 3a, thereby preventing the compact disc from being damaged or contaminated by foreign substances.

The driving operation of a general disc in a conventional tray structure for the optical recording reproducing device will now be explained.

When the general disc 5 is mounted on the general disc receiving unit 2, and the optical recording reproducing device is driven, the general disc 5 is rotated at a predetermined velocity by rotation of a spindle motor.

Here, the pickup is moved along the recording surfaces 5a, 5b of the general disc 5 which is being rotated, reading the information stored in the general disc 5, and then reproducing the information for the user.

However, the general disc 5 may contact fluid existing between the recording surfaces 5a, 5b thereof and the receiving surfaces 2a, 3a of the receiving units 2, 3, which results in serious vibration and noise. The degree of the vibration and noise is dependent upon the rotational velocity of the general disc 5 and the pressure of the fluid in contact with the general disc 5.

That is, the fluid existing at a static state in a certain space maintains an identical pressure, and thus does not cause noise and vibration. However, if the general disc 5 is rotated at a high velocity, a resistance generated when the recording surfaces 5a, 5b of the general disc 5 are contacted with the fluid is increases, thereby causing noise and vibration.

In addition, when the general disc 5 is rotated, if the space where the fluid exists is small, a pressure of the fluid becomes high, and as a result the resistance generated by the contact of the fluid and the disc is increased, thereby causing considerable vibration and noise.

It will now be described in more detail.

The compact disc receiving unit 3 of the tray 1 is more recessed than the general disc receiving unit 2. Accordingly, when the general disc 5 is mounted on the tray 1, the distance between the inside recording surface 5a of the general disc 5 and the second receiving surface 3a is greater than the distance between the outside recording surface 5b of the general disc 5 and the first receiving surface 2a.

That is, when the general disc 5 is rotated, the fluid having a high pressure is applied to the outside recording surface 5b of the general disc 5, as compared with the inside recording surface 5a thereof. Therefore, the resistance generated on the recording surface of the general disc 5 is higher on the outside recording surface 5b than the inside recording surface 5a.

On the other hand, as shown in FIG. 3, each unit of the disc which is rotated at a predetermined angular velocity has a different linear velocity.

That is, the angular velocity indicating a degree of an angle varied by a unit time according to rotation of the disc is identical from the rotation center of the disc to the outer circumferential portion thereof.

However, the linear velocity indicating a length of a distance varied by a unit time according to rotation of the disc is different in each part from the rotation center of the disc to the outer circumferential portion thereof.

For example, referring to FIG. 3, while a region a of the inside recording surface 5a of the general disc 5 is varied to a region a' for a predetermined time, a region b of the outside recording surface 5b is varied to a region b'. Accordingly, the linear velocity is less at the rotation center side of the general disc 5, and more at the outer circumferential portion thereof.

The linear velocity is thus greater at the outside recording surface 5b than at the inside 5 recording surface 5a.

That is, when the disc is rotated, the linear velocity gets increased from the center portion of the disc to the outer portion thereof. As a result, the outer portion of the disc having a higher linear velocity is in greater contact with the fluid, and thus receives more resistance by the fluid.

As discussed earlier, when the general disc 5 mounted on the tray 1 is rotated, the linear velocity of the outside recording surface 5b of the general disc 5 is higher than that of the inside recording surface 5a thereof. In addition, the distance between the outside recording surface 5b and the first receiving surface 2a is smaller than the distance between the inside recording surface 5a and the second receiving surface 3a. Accordingly, the resistance generated when the general disc 5 is contacted with the fluid is greater on the outside recording surface 5b than the inside recording surface 5a.

Therefore, the conventional tray structure of the optical recording reproducing device has a disadvantage in that the resistance generated when fluid contacts with each portion of the disc mounted and rotated on the tray is not regular, and thus the disc does not smoothly rotate, thereby causing vibration and noise.

Moreover, when the optical recording reproducing device requiring a high precision is driven, the vibration of the disc reduces a precision of the pickup reading the information recorded on the disc.

In addition, the vibration and noise decrease reliability of the device, and often cause a trouble.

SUMMARY OF THE INVENTION

It is therefore a primary object of the present invention to provide a tray structure for an optical recording reproducing device which can reduce vibration and noise by uniforming a resistance generated when a fluid contacts with each portion of the rotating disc which is being rotated.

It is another object of the present invention to provide a tray structure for an optical recording reproducing device which can improve reliability of the device by reducing a resistance generated when a fluid contacts with each portion of the rotating disc which is being rotated.

In order to achieve the above-described objects of the present invention, there is provided a tray structure for an optical recording reproducing device wherein a distance between each receiving surface of the tray for receiving and reproducing recording media having a different size and the recording medium is identical at a rotation center portion of the recording medium and an outer circumferential portion thereof.

In addition, in order to achieve the above-described objects of the present invention, there is provided a tray structure for an optical recording reproducing device including: a first receiving unit for receiving a first recording medium; and a second receiving unit for receiving a second recording medium which is larger than the first recording medium, and forming a concentric circle with the first receiving unit, a distance between a receiving surface of the first receiving unit and the recording medium being identical to a distance between a receiving surface of the second receiving unit and the recording medium.

In order to achieve the above-described objects of the present invention, there is provided a tray structure for an optical recording reproducing device wherein a distance between a receiving surface of the tray for receiving and reproducing a recording medium and the recording medium is increased from a center portion of the recording medium to an outer circumferential portion thereof.

Also, in order to achieve the above-described objects of the present invention, there is provided a tray structure for an optical recording reproducing device wherein a distance between a receiving surface of the tray for receiving and reproducing a recording medium and the recording medium is gradually decreased according to a rotation direction of the recording medium.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A tray structure for an optical recording reproducing device in accordance with the preferred embodiments of the present invention will now be described with reference to the accompanying drawings.

Figure 1:
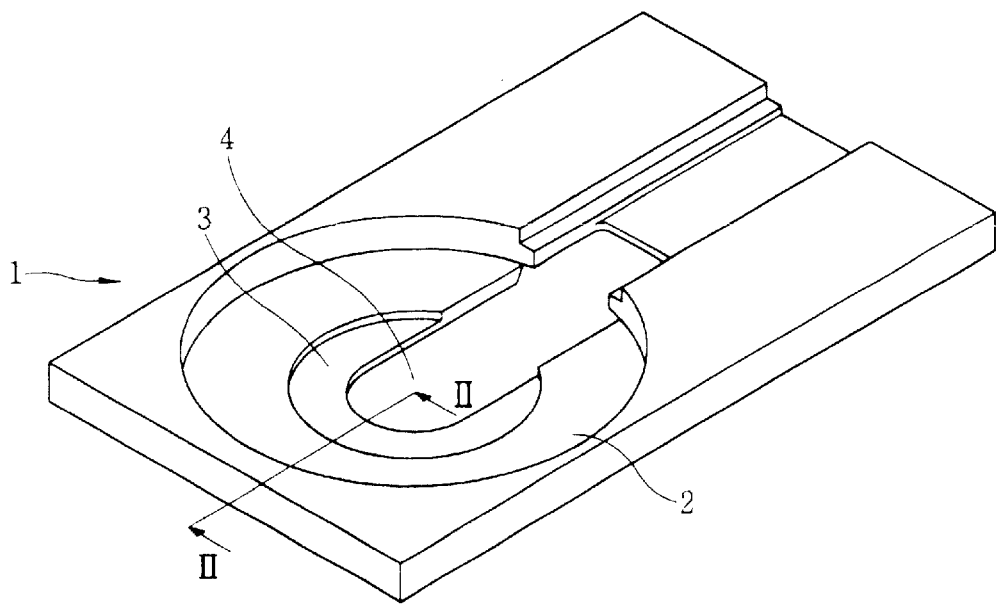
FIG. 1 is a perspective view illustrating a disc receiving unit of a conventional tray.
Figure 2:
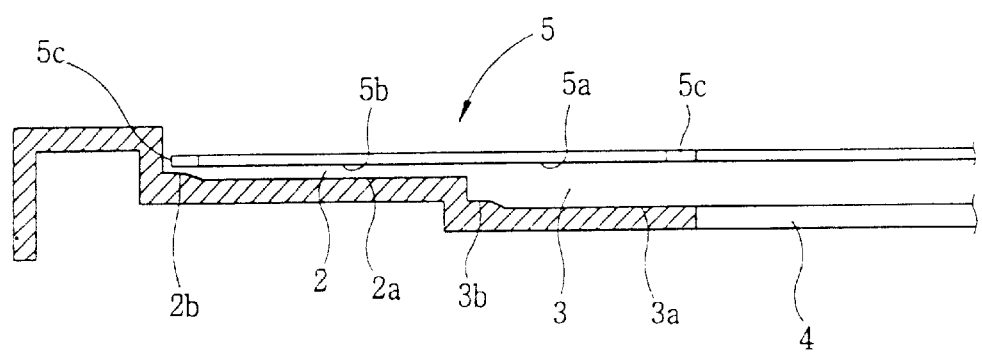
FIG. 2 is a cross-sectional view taken along line 11—11 in the configuration of FIG. 1 when a disc is mounted.
Figure 3:
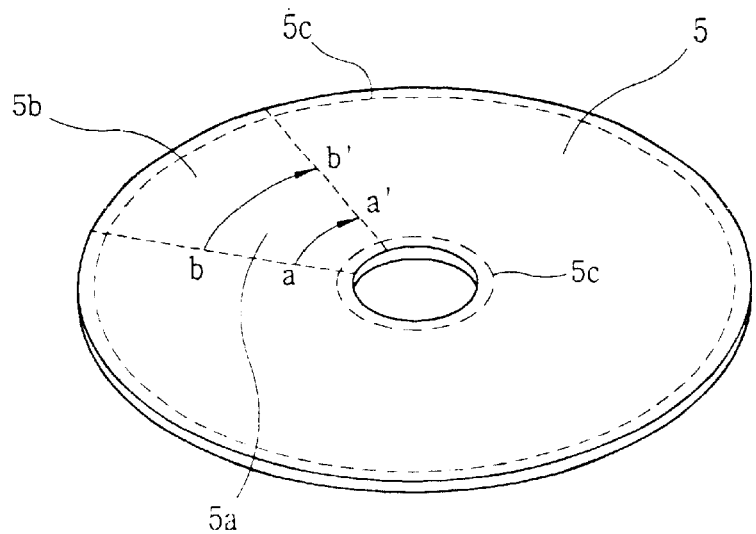
FIG. 3 is a perspective view illustrating a general disc structure.
Figure 4:
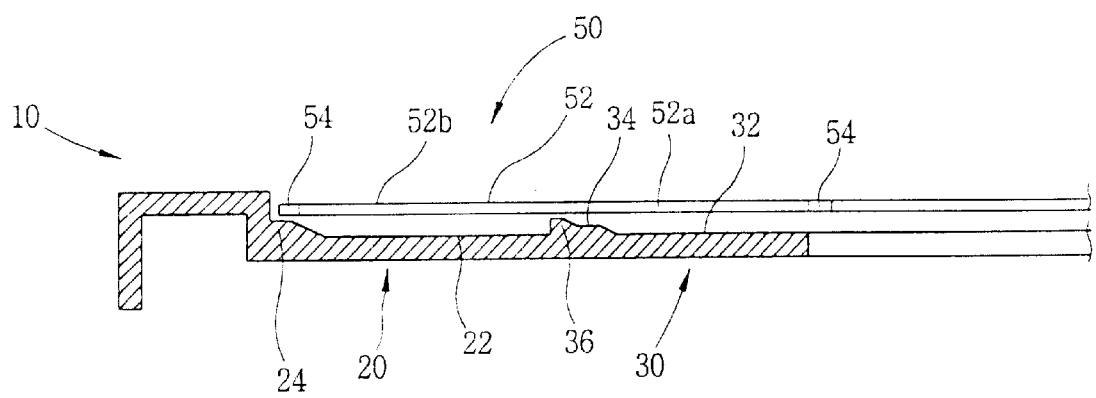
FIG. 4 is a partial cross-sectional view illustrating a structure of a disc receiving unit of a tray in accordance with a first embodiment of the present invention.

As illustrated in FIG. 4, a tray 10 for an optical recording reproducing device in accordance with a first embodiment of the present invention includes: a general disc receiving unit 20 which is a first receiving unit; and a compact disc receiving unit 30 which is a second receiving unit, in order to receive a general disc and a compact disc, respectively.

A first protrusion 24 is formed along an outer circumferential portion of a first receiving surface 22.

As discussed earlier, when a user mounts the general disc 50 on the tray 10, the first protrusion 24 serves to prevent information recorded on a recording surface 52 of the general disc 50 from being damaged or contaminated by foreign substances, by preventing the recording surface 52 from contacting the first and second receiving surfaces 22, 32.

That is, when the general disc 50 is mounted on the receiving unit 20, a non-recording surface 54 formed at the outer portion of the bottom surface of the general disc 50 is contacted and supported by the first protrusion 24, thereby preventing the recording surface 52b of the general disc 50 from contacting the first and second receiving surfaces 22, 32.

Similarly, a second protrusion 34 is formed along an outer circumferential portion of the second receiving surface 32 which is a receiving surface of the compact disc receiving unit 30. Accordingly, when the compact disc is mounted on the tray 10, the recording surface of the compact disc is prevented from contacting the second receiving surface 32 by the second protrusion 34, thereby preventing the information stored at the recording surface 52a of the compact disc from being damaged or contaminated by foreign substances.

According to the first embodiment of the present invention, the second receiving surface 32 of the compact disc receiving unit 30 and the first receiving surface 20 of the general disc receiving unit 20 are positioned on an identical plane.

That is, the first receiving surface 22 is horizontally formed at the inner bottom portion of the first protrusion 24 of the general disc receiving unit 20, and a compact disc supporting unit 36 is protrusively formed at the inner portion of the first receiving surface 22.

The second protrusion 34 supporting the outer portion of the compact disc is formed at the inner surface of the compact disc supporting unit 36, and the second receiving surface 32 is horizontally formed at the lower portion of the second protrusion 34 in order for the second receiving surface 32 to be positioned on an identical plane to the first receiving surface 22.

Here, the compact disc supporting unit 36 and the second protrusion 34 are formed lower than the first protrusion 24.

In this configuration, when the general disc 50 is mounted, a distance between an inside recording surface 52a of the general disc 50 and the second receiving surface 32 is identical to a distance between an outside recording surface 52b of the general disc 50 and the first receiving surface 22.

The operation of the disc in accordance with the first embodiment of the present invention will now be described.

After the general disc 50 is mounted on the general disc receiving unit 20 of the tray 10 as shown in FIG. 4, if the optical recording reproducing device is driven, the general disc 50 is rotated.

The lower surface of the general disc 50 to be rotated collides with a fluid existing in a space between the general disc 50 and the receiving surfaces 22, 32, thereby generating vibration and noise.

However, in accordance with the present invention, the distance between the inside recording surface 52a of the general disc 50 and the second receiving surface 32 is identical to the distance between the outside recording surface 52b of the general disc 50 and the first receiving surface 22, and thus the fluid of an identical pressure is applied to the inside and outside recording surfaces 52a, 52b of the general disc 50. As a result, the resistance which is generated when the fluid is contacted with each portion of the general disc 50 becomes identical. Accordingly, the general disc 50 can be stably operated, which results in reduced vibration and noise.

A tray structure for an optical recording reproducing device in accordance with a second embodiment of the present invention will now be explained.

Figure 5:
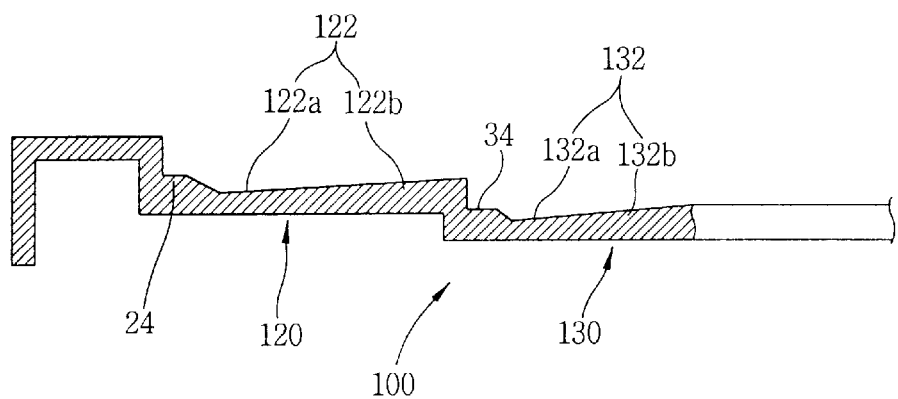
FIG. 5 is a partial cross-sectional view illustrating a structure of a disc receiving unit of a tray in accordance with a second embodiment of the present invention.

Referring to FIG. 5, in a tray 100 in accordance with the second embodiment of the present invention, receiving surfaces 122, 132 of disc receiving units 120, 130 are slopingly formed, and thus a fluid applied to each portion of the disc has a different pressure.

That is to say, the height of the receiving surface 122 of the general disc receiving unit 120 is gradually increased from its outer circumferential portion 122a to its center portion 122b.

In an identical way, the height of the receiving surface 132 of the compact disc receiving unit 130 is gradually increased from its outer circumferential portion 132a to its center portion 132b.

Accordingly, the respective distances between the disc and the receiving surfaces 122a, 132a adjacent to the protrusions 24, 34 is greater than a distance between the disc and the receiving surfaces 122b, 132b at the inner end portions of the disc receiving units 120, 130, thus increasing a movable space of the fluid.

As described above, the receiving surfaces 122, 132 are slopingly formed in order for air evenly contact with each portion of the rotated disc, thereby reducing vibration and noise.

Therefore, during the rotation of the disc, the greater the distance between the disc and the receiving surfaces 122, 132, the larger the movable space of the air. As a result, a fluid pressure applied to the disc is small, thus reducing the resistance generated when the fluid contacts with the disc.

That is, the portions of the rotated disc more distant from the rotation center, have a greater rotational linear velocity, and thus the resistance generated when the fluid contacts with the disc increases. In order to overcome this disadvantage, a contact resistance may be reduced by urging the fluid the outer portions which have a high linear velocity.

In accordance with the second embodiment of the present invention, the receiving surfaces 122, 132 are constantly sloped, and the distance between the outer portion wherein a linear velocity of the rotated disc is increased and the receiving surfaces 122a, 132a is increased, thereby reducing the resistance generated when the fluid is contacted with the disc. Accordingly, the fluid is evenly contacted with every portion of the disc, and thus vibration and noise are decreased due to an identical contact resistance.

A tray structure for an optical recording reproducing device in accordance with a third embodiment of the present invention will now be described.

Figure 6:
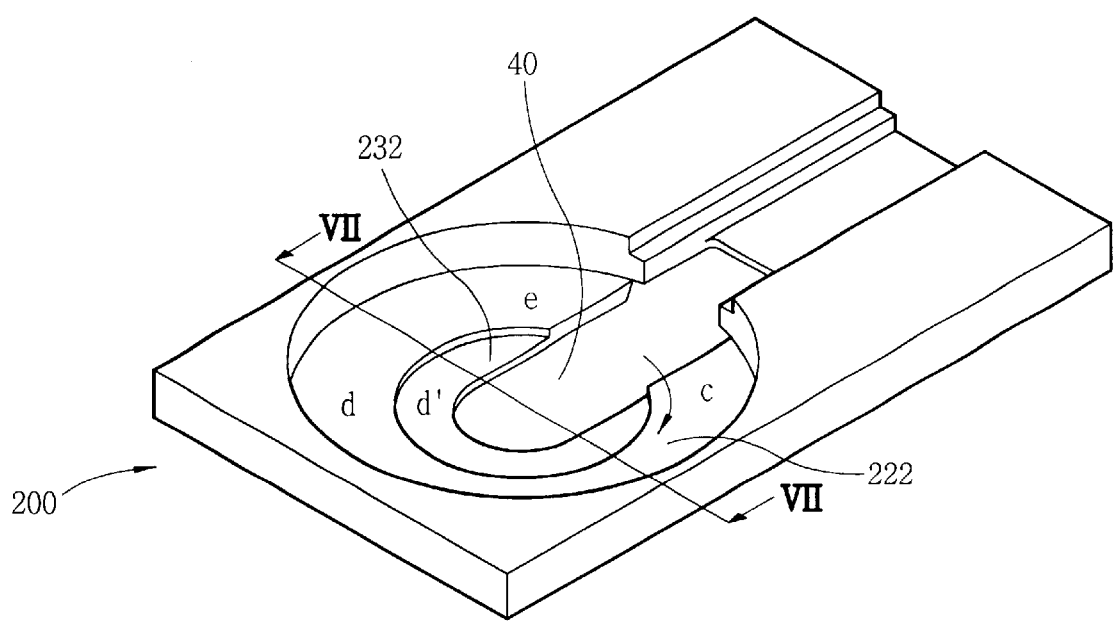
FIG. 6 is a perspective view illustrating a disc receiving unit of a tray in accordance with a third embodiment of the present invention.
Figure 7:
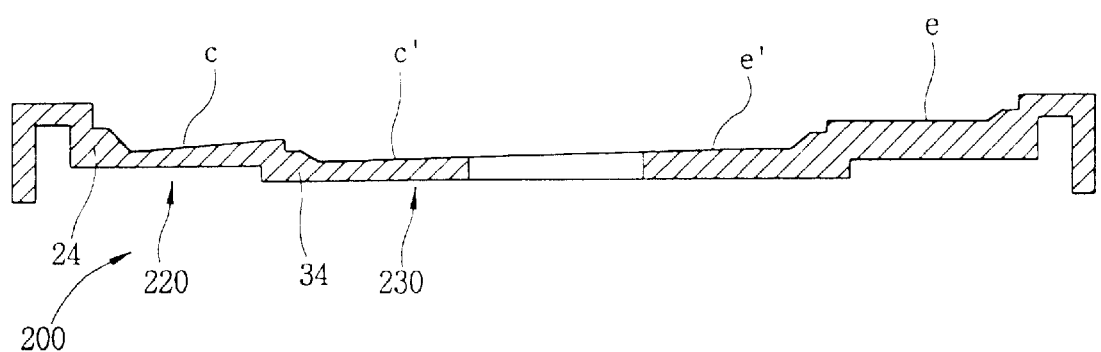
FIG. 7 is a cross-sectional view taken along line VII—VII in the configuration of FIG. 6.

As illustrated in FIGS. 6 and 7, in accordance with the third embodiment of the present invention, receiving surfaces 222, 232 have a different thickness according to a moving direction of a fluid while the optical recording reproducing device is driven.

That is, a distance between each receiving surface 222, 232 and the disc is gradually decreased along the rotation direction of the disc.

In more detail, referring to FIGS. 6 and 7, as the disc is rotated in a clockwise direction, the receiving surfaces 222, 232 become thicker from regions c, c' where the fluid is applied to regions e, e' where the fluid is discharged, through regions d, d'.

In the tray 200 in accordance with the third embodiment of the present invention, the distance between the receiving surfaces 222, 232 and the disc is greatest at the regions c, c' where the fluid is applied, and smallest at the regions e, e' where the fluid is discharged.

The thickness of the receiving surfaces 222, 232 is controlled according to the movable direction of the fluid in order to uniform the contact resistance of the fluid by the rotation of the disc.

When the disc is rotated, if a sufficient space for the fluid movement is not obtained in a rotation direction of the disc, namely at the regions c, c' where the fluid is applied, the resistance generated when the rotated disc is contacted with the fluid is increased. Accordingly, a space for the fluid movement is sufficiently obtained at the regions c, c' where a highest resistance is generated, and thus the resistance may be evenly generated at the whole surface of the disc.

In accordance with the third embodiment of the present invention, when the optical recording reproducing device is not operated, as described above, the distance between each receiving surface 222, 232 and the disc becomes smaller from the regions c, c' to the regions e, e', and thus a pressure of the fluid to be applied to the disc is lowest at the regions c', c', and is increased from the regions d, d' to the regions e, e'.

On the other hand, when the optical recording reproducing device is driven, and the disc is rotated in a clockwise direction, the fluid is rapidly moved in the rotation direction of the disc through a pickup unit 40 by the rotation force.

Here, the resistance generated due to the rapid flowing of the fluid is relatively high at the regions c, c', as compared with the regions d, d', e, e'. However, the distance between the receiving surfaces 222, 232 and the disc is relatively great at the regions c, c', as compared with the regions d, d', e, e', and thus the resistance can be decreased.

Accordingly, during the rotation of the disc, an almost identical resistance is generated at the regions c, c', d, d', e, e' due to the fluid.

Therefore, in accordance with the third embodiment of the present invention, the resistance generated when the fluid is contacted with each portion of the disc is uniformed, which results in reduced vibration and noise. Accordingly, the resistance is decreased, and thus vibration and noise may be more reduced.

Reference numerals 220 and 230 denote the general disc receiving unit and the compact disc receiving unit, respectively.

As discussed earlier, in accordance with the present invention, the disc can be stably rotated by uniforming the resistance generated when the fluid is contacted with each portion of the rotated disc, which results in reduced vibration and noise.

In addition, a precision of the pickup unit reproducing the information stored in the disc is improved by decreasing vibration, and thus quality of the device can be also improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A tray structure for an optical recording and or reproducing device, comprising:

a first receiving unit for receiving a first recording medium, having a first receiving surface; and a second receiving unit for receiving a second recording medium which has a larger diameter than that of the first recording medium, said second receiving unit having a second receiving surface and forming a concentric circle with the first receiving unit, a distance between said first receiving surface and said second recording medium being identical to a distance between said second receiving surface and said second recording medium.

2. A tray structure for an optical recording and/or reproducing device, comprising:

a general disc receiving unit for receiving a general disc, said general disc receiving unit having a first protrusion supporting a non-recording surface of the general disc and a first receiving surface being positioned below a recording surface of the general disc; and a compact disc receiving unit for receiving a compact disc which has a smaller diameter than that of the general disc, said compact disc receiving unit having a second protrusion for supporting a non-recording surface of the compact disc and a second receiving surface being positioned below a recording surface of the compact disc, a distance between said first receiving surface and said general disc being identical to a distance between said second receiving surface and said general disc.

\* \* \* \* \*